United States Patent [19]
Wegmuller et al.

[11] 3,787,180
[45] Jan. 22, 1974

[54] PROCESS FOR THE NON-AQUEOUS CONTINUOUS DYEING AND PRINTING OF FIBRE MATERIAL MADE FROM SYNTHETIC POLYAMIDE

[75] Inventors: Hans Wegmuller, Riehen; Alois Kleemann, Basel, both of Switzerland

[73] Assignee: Ciba-Geigy AG, Basel, Switzerland

[22] Filed: Apr. 9, 1971

[21] Appl. No.: 132,809

[30] Foreign Application Priority Data
Apr. 10, 1970 Switzerland.......................... 5312/70

[52] U.S. Cl. ........................................ 8/172, 8/173
[51] Int. Cl. ............................................... D06p 1/68
[58] Field of Search ........ 8/172, 173, 174, 6, 84, 85

[56] References Cited
UNITED STATES PATENTS

| | | | |
|---|---|---|---|
| 3,510,243 | 5/1970 | Seuret et al............................. | 8/39 |
| 2,922,690 | 1/1960 | Mueller et al. ....................... | 8/21 A |
| 3,657,220 | 4/1972 | Kilmurry............................ | 8/4 B X |
| 2,349,282 | 5/1944 | Kern..................................... | 8/6 X |

FOREIGN PATENTS OR APPLICATIONS

| | | | |
|---|---|---|---|
| 340,572 | 12/1930 | Great Britain............................. | 8/6 |
| 1,241,899 | 8/1971 | Great Britain............................ | 8/94 |

OTHER PUBLICATIONS
Colur Index, Vol. 2, 2nd Ed., 1956, pp. 2815–2816, Publ. AATCC Primary Examiner—Leon D. Rosdol
Assistant Examiner—T. J. Herbert, Jr.
Attorney, Agent, or Firm—Wenderoth, Lind & Ponack

[57] ABSTRACT

A process for the non-aqueous, continuous dyeing or printing of synthetic polyamide fibre material is disclosed, which comprises impregnating or printing this material with a solution of at least one dye salt consisting of the anionic radical of an anionic dyestuff and the cationic radical of an isothiourea derivative capable of salt formation, in a halogenated aliphatic hydrocarbon, optionally containing thickener, on its own or in admixture with a liquid, water-soluble organic solvent, removing excess dye liquor from the material and fixing the dyestuff by a heat treatment of the impregnated or printed fibre material at temperatures below the softening point of the fibre material, thereby obtaining a finished dyeing or print on said fibre material. By this process, on the stated fibre material are obtained deeply coloured, even and well developed dyeings having good fastness properties, such as fastness to wet processing, rubbing and dry cleaning.

12 Claims, No Drawings

PROCESS FOR THE NON-AQUEOUS CONTINUOUS DYEING AND PRINTING OF FIBRE MATERIAL MADE FROM SYNTHETIC POLYAMIDE

DETAILED DISCLOSURE

The present invention relates to a process for the non-aqueous, continuous dyeing and printing of fibre material made from synthetic polyamide, to the dye solutions usable for this purpose, as well as to the fibre material dyed or printed according to this process.

It has been found that deeply coloured and fast dyeings and printings can be produced on fibre material made from synthetic polyamide by impregnating or printing the fibre material with the solution of at least one dye salt consisting of the anionic radical of an anionic dyestuff and the cationic radical of an isothiourea derivative capable of salt formation in a halogenated aliphatic hydrocarbon, optionally containing thickeners, on its own or in admixture with a liquid water-soluble organic solvent; removing an appreciable part of the excess solvent from the material, and fixing the dyeing or the printing by a heat treatment at temperatures below the softening point of the fibre material.

Suitable isothiourea derivatives capable of salt formation, are, in particular, those of formula I:

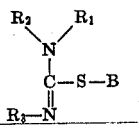

I wherein $R_1$, $R_2$ and $R_3$ each represent, independently of each other, hydrogen, an aliphatic, cycloaliphatic, araliphatic or aromatic hydrocarbon radical, whereby $R_2$ and $R_3$, together with the group

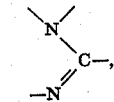

can also form the radical of a partially saturated ring, and

B represents an unsubstituted or substituted alkyl or alkenyl group having one to 18 carbon atoms in the main chain, which can be interrupted by hetero atoms; a cycloalkyl or an unsubstituted or substituted aralkyl radical.

Isothiourea derivatives of formula I are known per se and can be produced by known methods.

If $R_1$, $R_2$ and/or $R_3$ in formula I represent an aliphatic hydrocarbon radical, then they represent, in particular, unsubstituted lower alkyl groups having advantageously one to four carbon atoms, such as the methyl, ethyl, isopropyl, or tert.butyl groups. Suitable as cycloaliphatic hydrocarbon radicals denoted by $R_1$, $R_2$ and $R_3$ is, e.g. the cyclohexyl group. If $R_1$, $R_2$ and $R_3$ represent an araliphatic hydrocarbon radical, then this preferably contains seven to nine carbon atoms, such as the phenethyl group, and especially the benzyl group. If $R_1$, $R_2$ and/or $R_3$ denote an aromatic hydrocarbon radical, then this can be, e.g. an unsubstituted or substituted phenyl radical, whereby suitable substituents are halogen such as chlorine or bromine, lower alkyl or lower alkoxy groups preferably containing one or two carbon atoms.

If $R_2$ and $R_3$, together with the groups

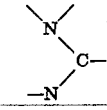

form the radical of a partially saturated ring, then this concerns, in particular, diazole or diazine rings. Examples in this case are the $\Delta_2$-imidazolinyl group or the $\Delta_2$-tetrahydropyri-midinyl group.

As unsubstituted or substitute alkyl or alkenyl groups having one to 18 carbon atoms in the main chain, B represents a straight-chain or branched alkyl or alkenyl group, which as substituents can contain, e.g. the hydroxyl group, a lower alkoxy group such as the methoxy or ethoxy group, or a phenoxy group, such as the methyl, ethyl, isopropyl, amyl, hexyl, octyl, dodecyl, tetradecyl, hexadecyl, octadecyl, octadec-9-enyl, $\beta$-hydroxyethyl, $\beta$-methoxyethyl, $\beta$-ethoxyethyl, $\beta$-phenoxyethyl, or 12-hydroxyoctadec-9-enyl group. If the main chain of the alkyl or alkenyl group B is interrupted by hetero atoms, then particularly suitable are chains interrupted by oxygen atoms. Mentioned as examples of such groups are the $\beta$-dodecyloxyethyl group and $\beta$-octadecenyloxyethyl group.

As a cycloalkyl radical, B denotes, in particular, the cyclohexyl radical. Mentioned as examples of unsubstituted or substituted aralkyl radicals represented by B are the phenethyl radical, and, in particular, the benzyl radical which may be substituted by alkyl groups having one to 10 carbon atoms, or halogen, especially chlorine.

On account of the therewith obtainable dyestuffs particularly readily soluble in solvents or in mixtures of solvents usable according to the invention, isothiourea derivatives of formula I are preferred wherein $R_1$, $R_2$ and $R_3$ each represent, independently of each other, hydrogen or an unsubstituted alkyl radical having one to four carbon atoms, and B denotes an unsubstituted alkyl or alkenyl radical having eight to 18 carbon atoms, such as the octyl, decyl, dodecyl, octadecyl, or octadec-9-enyl group, or the benzyl group.

Suitable halogenated, especially chlorinated, aliphatic hydrocarbons are, e.g. chloroform, carbon tetrachloride, trifluoro-trichloroethane, dichloroethane, trichloroethane, tetrachloroethane, dibromoethylene, dichloropropane, trichloropropane, pentachloropropane, chlorobutane, dichlorobutane or dichlorohexane, and especially tri- or tetrachloroethylene ("perchloroethylene"). Also mixtures of such solvents may be used.

In certain cases, the use of a solvent mixture consisting of 50 to 99 per cent by weight, preferably 80 to 99 per cent by weight, of halogenated, preferably chlorinated lower aliphatic hydrocarbon and 50 to 1 per cent by weight, preferably 20 to 1 per cent by weight, of a liquid water-soluble organic solvent has proved advantageous.

By "liquid, water-soluble organic solvents" are meant thermostable solvents which are soluble in water not only to the extent of fractions of one per cent but to the extent of several per cent. Examples of such solvents are higher alkanols such as butanols or amyl alcohols, cycloaliphatic alcohols such as cyclohexanol, araliphatic alcohols such as benzyl alcohol, or aliphatic or cycloaliphatic ketones such as methyl ethyl ketone or cyclohexanone. Such solvents as defined are, however, preferred which are miscible with water in any proportion. Examples of these are: monovalent lower aliphatic alcohols such as lower alkanols, e.g. methanol, ethanol, n- or iso-propanol; alkylene glycol monoalkyl ethers such as ethylene glycol monomethyl or -ethyl ether; then also furfuryl or tetrahydrofurfuryl alcohol, or bivalent aliphatic alcohols such as ethylene glycol or 1,2-propylene glycol; also lower aliphatic ketones such as acetone, lower cyclic ethers such as dioxane; also N,N-dialkylamides of lower monocarboxylic acids such as dimethylformamide or dimethylacetamide, amides of carbonic acid such as N,N,N',N'-tetramethylurea, cyclic amides such as N-methylpyrrolidone, as well as mixtures of such liquid, water-soluble organic solvents.

Preferred solvent mixtures consist of 90 to 99 per cent by weight of trichloroethylene, perchloroethylene, or trichloroethane, and 10 to 1 per cent by weight of a lower alkanol such as methanol, or of an N,N-dialkylamide of lower monocarboxylic acids such as dimethylacetamide or dimethylformamide.

When selecting a solvent or solvent mixture, it is to be ensured that, with the attainment of the optimum dyeing effect, no damage, or the smallest possible damage, thereby occurs to the fibres.

Anionic dyestuffs usable according to the invention can belong to the most diverse classes such as, e.g. to those of the oxazine, triphenylmethane, xanthene, nitro, methine, quinophthalone, acridone, or phthalocyanine dyestuffs, especially, however, to the class of metallised and metal-free mono-, dis- or polyazo dyestuffs, and to the class of anthraquinone dyestuffs or copperphthalocyanine dyestuffs. Of the stated non-metallised azo and anthraquinone dyestuffs, those are preferred which contain one or two sulphonic acid groups. Suitable metal complex azo dyestuffs are, e.g. such ones which contain to one metal atom two azo dyestuff molecules. Suitable metal atoms are, in particular, chromium or cobalt. These 1:2-metal complexes can moreover be free of acid water-solubilising groups such as carboxylic acid groups, and especially sulphonic acid groups, and can contain, in their place, alkyl-sulphonyl or sulphamoyl groups. Surprisingly, also with such 1:2-metal complexes are obtained by the process according to the invention particularly deeply coloured and fast dyeings. Also mentioned are the formazane dyestuffs containing as the metal atom, in particular, copper, but also nickel.

The production of the dye salts from the anionic dyestuff and the isothiourea derivative capable of salt formation can be performed in situ, i.e. in the solvent or solvent mixture itself. Preferably, however, the dye salts are produced in a manner known per se beforehand, and then added to the solvent or solvent mixture. The preparation of the dye salts can thereby be effected, e.g. by double reaction, advantageously in the heat, by reacting the alkali metal salt or ammonium salt, especially the sodium salt, of the anionic dyestuff with the salt of an isothiourea derivative usable according to the invention with a strong acid, e.g. hydrochloric acid. Optionally, the desired dye salts can be produced direct by neutralisation of the anionic dyestuffs in the form of their free acids with the isothiourea derivatives. If the dye salts are produced in situ, then the anionic dyestuffs are advantageously used likewise in the form of their alkali metal salts or ammonium salts, especially in the form of their sodium salts. Also the isothiourea derivative is thereby advantageously used in the form of a salt with a strong acid. In this case it is advantageous, if the prepared dye liquor still contains insoluble constituents, to clear the liquor of insoluble substances, e.g. by filtration, before the fibre material to be dyed or printed is introduced.

If anionic dyestuffs are used which can form doubly or multiply negatively charged anions, it is in many cases not necessary for these charges to be completely compensated by the isothiourea derivative.

The dye solution to be used according to the invention preferably contains, depending on the desired depth of colour, 0.1 to 30 per cent by weight, calculated on the weight of the material to be dyed, of one or several of the dye salts defined hereinbefore.

If necessary, the dye solution usable according to the invention may also contain thickeners, advantageously such thickeners which are soluble in the solvent or solvent mixture as defined, e.g. ethyl cellulose.

Suitable fibre materials made from synthetic polyamide which can be dyed or printed according to the invention are, in particular, polyhexamethyleneadipamide (Polyamide 6.6, Nylon), polycaprolactam (Polyamide 6, "Perlon") and polyaminoundecanoic acid (Polyamide 11, "Rilsan"), especially in the form of filament; also textured synthetic polyamide fibres such as "Banlon". The stated fibre materials can be dyed or printed according to the invention in any desired form, e.g. in the form of flock, slubbing, yarn, or — preferably — fabrics.

The continuous impregnation of the fibre material is effected, for example, by printing or spraying, preferably, however, by pad dyeing. In the last-mentioned case, the fibre material is advantageously passed at room temperature continuously through the dye solution, and afterwards squeezed out to obtain the desired content of impregnating solution of approximately 30 to 150 per cent by weight (relative to the dry weight of the material). The main proportion of the solvent or solvent mixture remaining in the fibre material is advantageously subsequently removed under mild conditions at 40° to 80°C, especially in a warm dry air stream.

Fixing of the dyestuff on the still moist or already dry fibre material, from which the excess dye liquor has been removed, is carried out, e.g. by steaming in water vapour or solvent vapour, preferably, however, by a dry heat treatment below the softening point of the fibre material. It is also possible to combine these two forms of heat treatment. A suitable dry heat treatment consists in exposing the material to the action of high frequency alternating currents, or to infra-red rays; preferably, however, fixing of the dyestuff on the fibre material is effected in a hot air stream and, in particular, by means of contact heat at 150° to 230°C, especially at a temperature of 190° to about 220°C, for 60 to 180 seconds.

Using the process according to the invention are obtained on the stated fibre material, even deeply coloured, and, without any aftertreatment, fast dyeings, e.g. dyeings fast to dry cleaning, washing, perspiration and rubbing.

In comparison to the use of the alkali salts, especially sodium salts of the corresponding anionic dyestuffs, the use according to the invention of the isothiourea dye salts as defined promotes, on heat treatment, the diffusion of the dye salts into the fibres, in consequence of which the colour strength is increased and the fastness properties of the thereby obtained dyeings or printings are in many cases improved.

A special advantage of the process according to the invention is that it is particularly suitable for the dyeing and printing of fibre material made from synthetic polyamide using mixtures of dye salts of anionic dyestuffs of various classes, e.g. mixtures of the isothiourea dye salts of the above mentioned 1:2-metal complex dyestuffs, containing alkylsulphonyl and/or sulphamoyl groups, with isothiourea dye salts of metal-free dyestuffs containinings sulphonic acid groups. Thereby are obtained, in most cases, in contrast to dyeings obtained from a procedure using a mixture of the corresponding anionic dyestuffs from an aqueous medium, very even dyeings.

Temperatures are given in °C in the following examples.

EXAMPLE 1

At 40° – 50°C, 8.0 g of the dyestuff of the formula

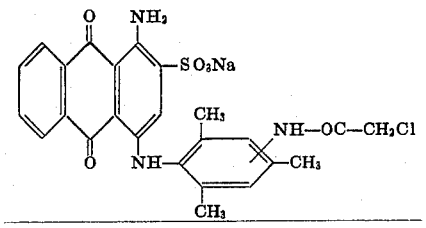

and 3.0 g of S-benzyl-isothiourea-chlorohydrate are dissolved in 100 g of ethanol. The obtained solution is afterwards diluted with 900 g of trichloroethylene. The slight amounts of precipitated material are removed by filtration of the solution.

With the thus prepared dark-blue-coloures, clear dye salt solution is impregnated a fabric made from Polyamide 6.6 or 6; the material is then squeezed out to ca. 80 percent liquor absorption, relative to the dry weight of the material. The impregnated fabric is subsequently dried at 50° in an air stream, and then heated for 60 seconds to 200°.

In this manner are obtained well developed even, deeply coloured, blue dyeings having very good fastness to rubbing, to perspiration, and to dry cleaning.

EXAMPLE 2

An amount of 10 g of the dye salt of the formula

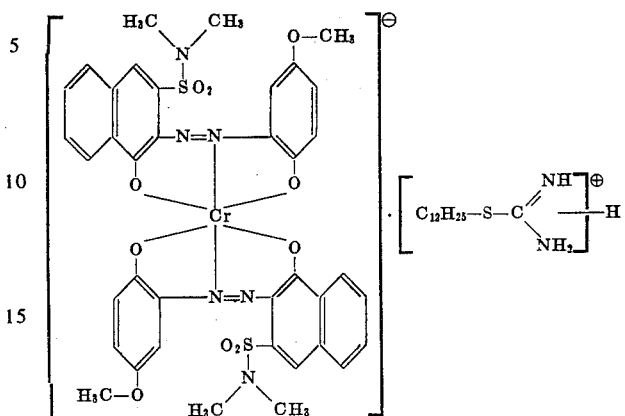

is dissolved in 990 g of trichloroethylene. A fabric made from Polyamide 6 is impregnated with the obtained solution. After being squeezed out to obtain a liquor absorption of 80 percent, the impregnated fabric is dried in a hot air stream at 80°, and subsequently thermofixed for 90 seconds at 200°.

Thus obtained is a deeply coloured, even and well developed blue dyeing having good fastness to rubbing.

By using in the above example with otherwise the same procedure, instead of 990 g of trichloroethylene, the same amount of trichloroethane, blue dyeings are obtained of equal quality.

EXAMPLE 3

An amount of 10 g of the dye salt of the formula

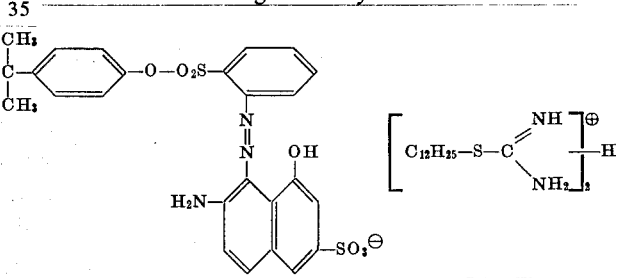

is dissolved in a solvent mixture consisting of 920 g of trichloroethylene and 70 g of methanol. With the obtained solution is impreganted a knitted fabric made from Polyamide 6, as described in Example 1. The impreganted knitted fabric is afterwards thermofixed during 90 seconds at 200°.

Thus obtained is a deeply coloured, even and well developed red dyeing on the above stated material.

The above dye salt is obtained, for example, as follows: An amount of 10.8 g of the dyestuff of the formula

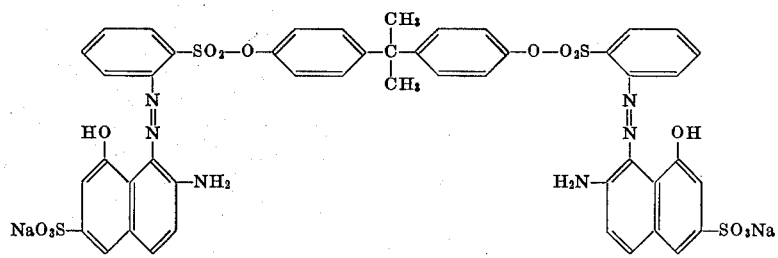

is dissolved in 1000 ml of water at 50°. In 1000 ml of water at 50° are then separately dissolved 5.6 g of S-dodecylisothiourea-chlorohydrate. The two solutions are combined, resulting in the immediate formation of a red precipitate in a finely dispersed form. To the still warm dispersion are then added, with stirring, 40 g of sodium chloride, and the reaction mixture is allowed to stand for one to two days at room temperature. After this period of time, the dye salt has practically completely settled out. The colourless solution on top is decanted off; the sediment is filtered off under suction and then dried in vacuo at 50°–60°. In this manner are obtained 12.2 g of the dye salt of the formula given in the first paragraph of this example, the dye salt being in the form of a solid brittle mass.

EXAMPLE 4

An amount of 10 g of the dye salt of the formula

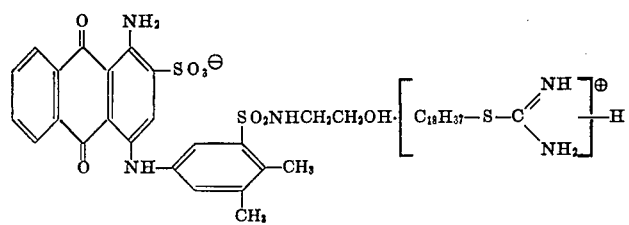

is dissolved in a solvent mixture consisting of 900 g of trichloroethylene and 90 g of methanol. With the obtained clear blue dye salt solution is impregnated at room temperature fabric made from Polyamide 6.6; the impregnated fabric is then squeezed out to give a liquor absorption of ca. 80 percent, relative to the dry weight of the material, and dried at 40°–80° in an air stream. The impregnated fabric is afterwards thermofixed for 90 seconds at 210°.

Thus obtained is a deeply coloured, even and well developed blue dyeing having good fastness to rubbing, to water, and to dry cleaning. If, instead of a fabric made from Polyamide 6.6, a fabric or knitted material made from Polyamide 6 is used, with otherwise the same procedure as described in the example, then likewise is obtained a deeply coloured and well developed blue dyeing having good fastness to rubbing.

If, in the above example, the 90 g of methanol are replaced by the same amount of one of the solvents listed in the following Table I, Column 2, with otherwise the same procedure as described in the example, then blue dyeings are obtained of equal quality.

TABLE I

| Example No. | Water-miscible solvents |
|---|---|
| 5 | ethanol |
| 6 | isopropanol |
| 7 | ethylene glycol monomethyl ether |
| 8 | tetrahydrofurfuryl alcohol |
| 9 | dimethylacetamide |
| 10 | N,N,N′,N′-tetramethylurea |
| 11 | dioxane |
| 12 | N-methylpyrrolidone |
| 13 | dimethylformamide |

If in the Example 4 to 13 is used, instead of 900 g of trichloroethylene, the same amount of one of the halogenated hydrocarbons listed in the following Table II, Column 2, with otherwise the same procedure as given in this example, then likewise are obtained even and well developed dyeings.

TABLE II

| Example No. | Halogenated hydrocarbon |
|---|---|
| 14 | trifluorotrichloroethane |
| 15 | trichloroethane |
| 16 | tetrachloroethylene |

EXAMPLE 17

An amount of 10 g of the dye salt of the formula

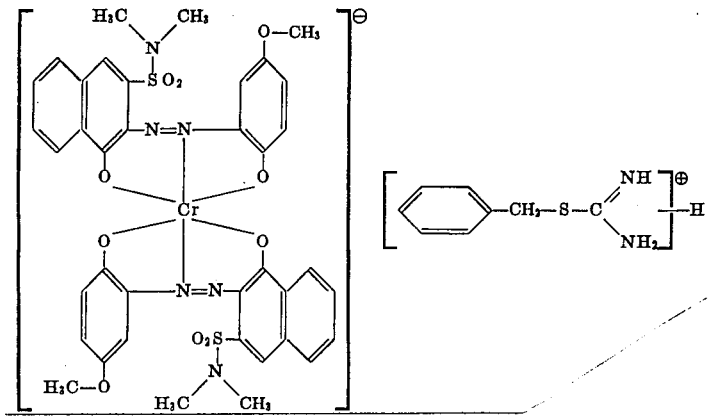

is dissolved in a solvent mixture consisting of 920 g of trichloroethylene and 70 g of methanol. With this solution is impregnated a knitted fabric made from Polyamide 6, as described in Example 1. The impregnated fabric is afterwards thermofixed for 90 seconds at 200°.

A deeply coloured, even and well developed blue dyeing is obtained on the above stated materials.

If, instead of the described dye salt, a corresponding amount of the dyestuff sodium salt is used, the procedure being otherwise as described in the example, then an appreciably weaker dyeing is obtained.

EXAMPLE 18

An amount of 10 g of the dye salt of the formula

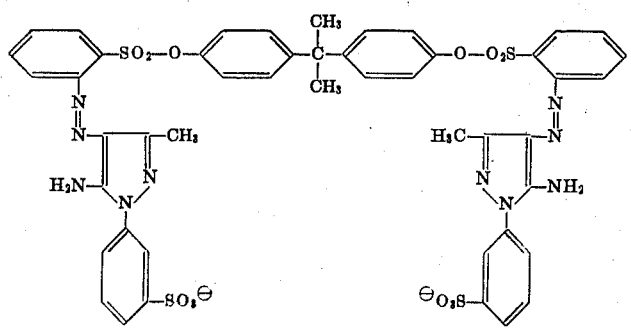
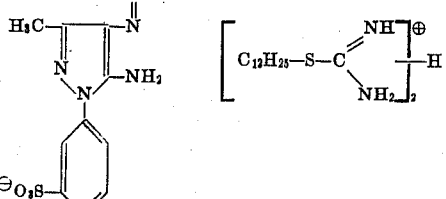

is dissolved in a solvent mixture consisting of 920 g of trichloroethylene and 70 g of methanol. With the thus obtained clear yellow dye salt solution is impregnated at room temperature a fabric made from Polyamide 6.6; the impregnated fabric is squeezed out to obtain a liquor absorption of ca. 60 percent, relative to the dry weight of the material, and dried at 40°–80° in an air stream. The impregnated fabric is afterwards thermofixed for 90 seconds at 210° by the action of contact heat.

Thus obtained is a deeply coloured, even and well developed yellow dyeing having good fastness to rubbing, to water, and to dry cleaning.

If, instead of the dye salt given in the above example, the same amount of one of the dye salts listed in the following Table III, Column 2, is used, the procedure being otherwise as described above, then likewise are obtained deeply coloured dyeings of Polyamide 6.6 in the shades given in the last column of the table.

TABLE III

| Example number | Dye salt | Shade on polyamide 6.6 |
| --- | --- | --- |
| 19 | [structure] | Blue. |
| 20 | [structure] | Yellow. |
| 21 | [structure] | Green. |
| 22 | [structure] | Yellow. |

TABLE III.—Continued

| Example number | Dye salt | | Shade on polyamide 6.6 |
|---|---|---|---|
| 23 | [azo dye structure with pyrazole, SO₂-O-phenyl-Cl, Cl, SO₃⁻] | × [H-phenyl-S-C(=NH)-NH-C₂H₅]⁺ H | Do. |
| 24 | [azo dye structure with pyrazole, SO₂-O-phenyl-Cl, Cl, SO₃⁻] | × [CH₃CH₂CH₂-S-C(=N-CH₂CH₂CH₃)(N(CH₂CH₂CH₃)₂)]⁺ H | Do. |
| 25 | [azo dye structure with pyrazole, SO₂-O-phenyl-Cl, Cl, SO₃⁻] | × [CH₂CH₂-S-C(=N-CH₂)(NH-CH₂) cyclic]⁺ H | Do. |
| 26 | [azo dye structure with pyrazole, SO₂-O-phenyl-Cl, Cl, SO₃⁻] | × [HOCH₂CH₂-S-C(=N-phenyl)(NH-phenyl)]⁺ H | Do. |
| 27 | [bis-azo dye structure bridged by -SO₂-O-C₆H₄-C(CH₃)₂-C₆H₄-O-SO₂-, with pyrazole groups, SO₃Na and ⁻O₃S] | × [C₁₂H₂₅-S-C(=NH)-NH-phenyl-H]⁺ H | Do. |
| 28 | [anthraquinone dye with NH₂, SO₃⁻, NH-(2,6-dimethylphenyl)-CH₂NHCO-phenyl] | × [phenyl-CH₂-S-C(=NH)-NH-CH₂-phenyl]⁺ H | Blue. |
| 29 | [anthraquinone dye with NH₂, SO₃⁻, NH-(2,6-dimethylphenyl)-CH₂NHCO-phenyl] | × [phenyl-OCH₂CH₂-S-C(=NH)-NH₂]⁺ H | Do. |

TABLE III.—Continued

| Example number | Dye salt | | Shade on polyamide 6.6 |
|---|---|---|---|
| 30 | 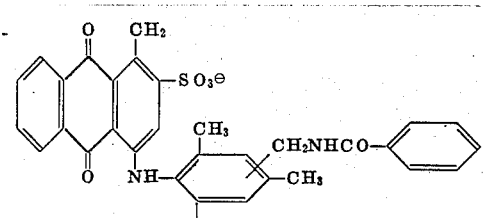 | | Do. |
| 31 | 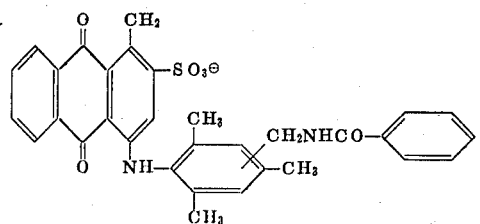 | | Do. |

EXAMPLE 32

An amount of 30 g of the dye salt of the formula

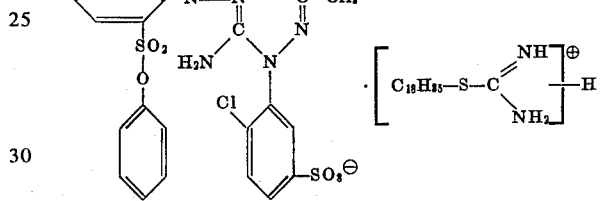

is dissolved in a solvent mixture consisting of 900 g of trichloroethylene and 70 g of dimethylacetamide. A fabric made from Polyamide 6.6 is impregnated at room temperature with the thus obtained clear yellow dye salt solution; the impregnated fabric is squeezed out to obtain a liquor absorption of ca. 80 percent, relative to the dry weight of the material, and is then dried at 40°–80° in an air stream. The fabric is afterwards thermofixed for 90 seconds at 210° by the action of contact heat.

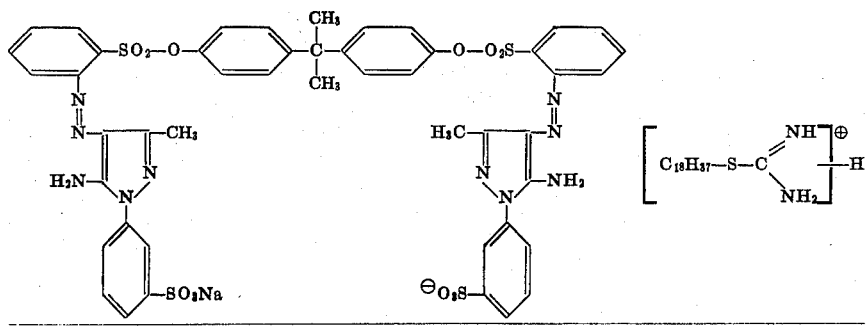

Thus obtained is a deeply coloured, even and well developed yellow dyeing having good fastness to rubbing, to water, and to dry cleaning.

If in the above example is used, instead of 900 g of trichloroethylene, the same amount of tetrachloroethylene or trichloroethane, with otherwise the same procedure, then likewise are obtained well developed yellow dyeings having similar properties.

EXAMPLE 33

An amount of 10 g of the dye salt of the formula is dissolved in 990 g of trichloroethylene. With the obtained solution is impregnated a fabric made from Polyamide 6. After being squeezed out to obtain a liquor absorption of 80 percent, the impregnated fabric is dried in a hot air stream at 80°, and afterwards thermofixed for 90 seconds at 200°.

In this manner is obtained a deeply coloured, even and well developed yellow dyeing having good fastness to rubbing.

Similarly good results are obtained if the fabric, instead of being thermofixed for 90 seconds at 200°, is steamed for 5 minutes with superheated perchloroethylene vapour at 140°–150°.

EXAMPLE 34

In a solvent mixture consisting of 915 g of trichloroethylene and 70 g of methanol are dissolved 3.5 g of the dye salt of the formula

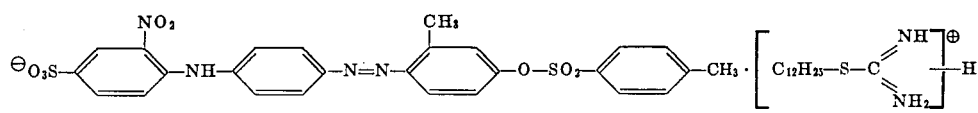

2 g. of the dye salt of the formula

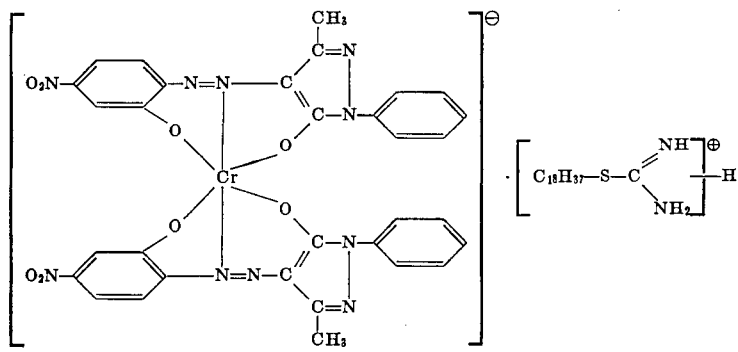

as well as 10 g. of the dye salt of the formula

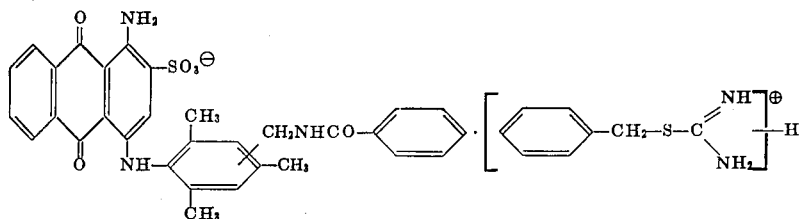

With the obtained clear dark grey dye salt solution is impregnated at room temperature fabric made from Polyamide 6.6; the impregnated fabric is squeezed out to obtain a liquor absorption of 70 percent, relative to the dry weight of the material, and then dried at 40°–80° in an air stream. The fabric is afterwards thermofixed for 90 seconds at 210° by the action of contact heat.

Thus obtained is a deeply coloured, even and well developed grey dyeing having good fastness to rubbing, to water, and to dry cleaning.

If, instead of a fabric made from Polyamide 6.6, a fabric or knitted article made from Polyamide 6 is used, the procedure being otherwise as described in the article, then likewise is obtained a deeply coloured and well developed grey dyeing having good fastness to rubbing.

We claim:

1. A process for the non-aqueous, continuous dyeing or printing of synthetic polyamide fibre material, which comprises:
    a. impregnating or printing synthetic polyamide fibre material with a solution of at least one dye salt consisting of the anionic radical of an anionic dyestuff and the cationic radical of an isothiourea derivative capable of salt formation of the formula

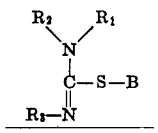

wherein
    $R_1$, $R_2$ and $R_3$ each represent, independently of each other, hydrogen, an aliphatic, cycloaliphatic, araliphatic, or aromatic hydrocarbon radical, whereby $R_2$ and $R_3$, together with the group

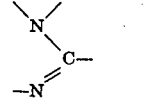

can also form the radical of a partially saturated ring, and
    represents an unsubstituted or substituted alkyl or alkenyl group having 1 to 18 carbon atoms in the main chain, which can be interrupted by hetero atoms; a cycloalkyl or an unsubstituted or substituted aralkyl radical
        I. in a solvent selected from halogenated aliphatic hydrocarbon, or
        II. in a solvent mixture which consists of
            α. halogenated aliphatic hydrocarbon and
            β. a liquid water-soluble, organic solvent selected from the group consisting of alkanols, cycloaliphatic alcohols, araliphatic alcohols, aliphatic and cycloaliphatic ketones, alkylene glycol monoalkyl ethers, furfuryl alcohol, tetrahydrofurfuryl alcohol, divalent aliphatic alcohols, lower cyclic ethers, N,N-dialkylamides of lower monocarboxylic acids, amides of carbonic acid and mixtures thereof,
    b. removing a substantial part of excess dye liquor from the material, and
    c. fixing the dyestuff by a heat treatment of the impregnated or printed fibre material at temperatures below the softening point of the fibre material, thereby obtaining a finished dyeing or print on the said fibre material.

2. A process as described in claim 1, further comprising (III) thickener admixed with said solvent (I) or solvent mixture (II).

3. A process as described in claim 1, wherein the solvent defined under (I) consists of chlorinated lower aliphatic hydrocarbon.

4. A process as described in claim 1, wherein said solvent is trichloroethylene or tetrachloroethylene.

5. A process as described in claim 1, wherein the solvent mixture defined under (II) consists of
    α. 50 to 99 percent by weight of halogenated lower aliphatic hydrocarbon, the balance consisting of
    β. a liquid, water-soluble organic solvent selected from the group consisting of alkanols, cycloaliphatic alcohols, araliphatic alcohols, aliphatic and cycloaliphatic ketones, alkylene glycol monoalkyl ethers, furfuryl alcohol, tetrahydrofurfuryl alcohol, divalent aliphatic alcohols, lower cyclic ethers, N,N-dialkylamides of lower monocarboxylic acids, amides of carbonic acid and mixtures thereof.

6. A process as described in claim 5, wherein the water-soluble organic solvent defined unter (IIβ) is selected from the group consisting of methanol, ethanol, n.propanol, isopropanol, butanols, pentanols, cyclohexanol, benzyl alcohol, acetone, methylethyl ketone, cyclohexanone, ethylene glycol monomethyl ether, ethylene glycol monoethyl ether, furfuryl alcohol, tetrahydrofurfuryl alcohol, ethylene glycol, 1,2-propylene glycol, dioxane, dimethylformamide, dimethylacetamide, N,N,N',N'-tetramethyl urea, and mixtures of such solvents.

7. A process as described in claim 1, wherein the solvent mixture defined unter (II) consists of 80 to 99 percent by weight of a chlorinated, lower aliphatic hydrocarbon, the balance consisting of a water-soluble organic solvent.

8. A process as described in claim 1, wherein the solvent mixture defined under (II) consists of 90 to 99 percent by weight of trichloroethylene, perchloroethylene or trichloroethane, the balance consisting of methanol, dimethylacetamide or dimethylformamide.

9. A process as described in claim 1, wherein the imprenated or printed material is subjected to a dry heat treatment.

10. An organic non-aqueous dye liquor comprising
A. a halogenated aliphatic hydrocarbon on its own or in admixture with a liquid, water-soluble organic solvent, and (B) a dye salt consisting of the anionic radical of an anionic dyestuff and the cationic radical of an isothiourea derivative capable of salt formation of the formula

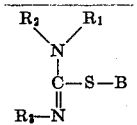

wherein
$R_1$, $R_2$ and $R_3$ each represent, independently of each other, hydrogen, an aliphatic cycloaliphatic, araliphatic, or aromatic hydrocarbon radical, whereby $R_2$ and $R_3$, together with the group

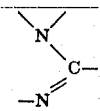

can also form the radical of a partially saturated ring, and
represents an unsubstituted or substituted alkyl or alkenyl group having one to 18 carbon atoms in the main chain, which can be interrupted by hetero atoms; a cycloalkyl or an unsubstituted or substituted aralkyl radical.

11. An organic non-aqueous dye liquor as described in claim 10, comprising
C. thickener in admixture with said mixture of (A) and (B).

12. A process as described in claim 1 wherein the isothiourea derivative is of the formula

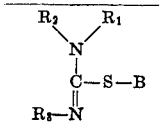

wherein
$R_1$, $R_2$ and $R_3$ each represent, independently of the other, hydrogen, lower alkyl of one to four carbon atoms, cycloalkyl of up to six carbon atoms, phenyl lower alkyl of seven to nine carbon atoms, phenyl, phenyl substituted by a member of the group (a) chlorine, (b) bromine, (c) lower alkyl of one to two carbon atoms and (d) lower alkoxy of one to two carbon atoms, or
$R_2$ and $R_3$, together with the group

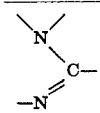

form a diazole or a diazine ring, and
B represents (a) straight or branched chain alkyl or alkenyl of one to 18 carbon atoms, (b) substituted straight or branched chain alkyl or alkenyl of one to 18 carbon atoms wherein the substituents are selected from the group of hydroxy, lower alkoxy and phenoxy, (c) straight or branched chain alkyl or alkenyl of one to 18 carbon atoms wherein the main chain is interrupted by an oxygen atom, (d) cycloalkyl of up to six carbon atoms, (e) phenyl lower alkyl, or (f) phenyl lower alkyl substituted by a member of the group of alkyl of one to 10 carbon atoms and chlorine.

* * * * *